（12）United States Patent
Attaluri et al.

(10) Patent No.: US 8,494,999 B2
(45) Date of Patent: Jul. 23, 2013

(54) SENSOR BASED TRUTH MAINTENANCE METHOD AND SYSTEM

(75) Inventors: Prabhakar Attaluri, Aurora, IL (US); Mickey Iqbal, Tucker, GA (US); Calvin D. Lawrence, Lithonia, GA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/888,476

(22) Filed: Sep. 23, 2010

(65) Prior Publication Data

US 2012/0075067 A1    Mar. 29, 2012

(51) Int. Cl.
*G06N 5/02* (2006.01)
*G06F 17/00* (2006.01)

(52) U.S. Cl.
USPC ............... 706/51; 340/511; 340/572.1

(58) Field of Classification Search
None
See application file for complete search history.

(56) References Cited

U.S. PATENT DOCUMENTS

| | | | |
|---|---|---|---|
| 5,955,950 A | 9/1999 | Gallagher, III et al. | |
| 6,832,199 B1 | 12/2004 | Kucek et al. | |
| 7,378,967 B2 | 5/2008 | Sullivan et al. | |
| 7,447,670 B1 * | 11/2008 | Chen ............................ | 706/52 |
| 7,479,883 B2 | 1/2009 | Chiu | |
| 7,528,696 B2 | 5/2009 | Mickle et al. | |
| 7,538,678 B2 * | 5/2009 | Jung et al. ............... | 340/572.1 |
| 2003/0198316 A1 * | 10/2003 | Dewaele et al. ............. | 378/54 |
| 2005/0007249 A1 * | 1/2005 | Eryurek et al. ............ | 340/511 |
| 2005/0209886 A1 | 9/2005 | Corkern | |
| 2006/0049250 A1 | 3/2006 | Sullivan | |
| 2007/0194939 A1 | 8/2007 | Alvarez et al. | |
| 2008/0010225 A1 * | 1/2008 | Gonsalves et al. ............ | 706/11 |
| 2008/0033894 A1 | 2/2008 | Steck et al. | |
| 2008/0055085 A1 | 3/2008 | Sambourski et al. | |
| 2008/0122622 A1 | 5/2008 | Archer et al. | |
| 2008/0275731 A1 | 11/2008 | Rao et al. | |
| 2009/0002163 A1 | 1/2009 | Farrington et al. | |
| 2009/0085738 A1 | 4/2009 | Darianian et al. | |
| 2009/0089239 A1 | 4/2009 | Herrera et al. | |
| 2009/0177495 A1 | 7/2009 | Abousy et al. | |
| 2009/0326981 A1 | 12/2009 | Karkanias et al. | |
| 2010/0056877 A1 | 3/2010 | Fein et al. | |
| 2010/0114781 A1 | 5/2010 | Kassas | |
| 2010/0205739 A1 | 8/2010 | Gallant et al. | |
| 2012/0078835 A1 | 3/2012 | Attaluri et al. | |

OTHER PUBLICATIONS

El-Azhary et al., Diagnostic Expert System Using Non-monotonic Reasoning. Expert Systems with Applications, vol. 23, (2002) pp. 137-144.*

(Continued)

*Primary Examiner* — Kakali Chaki
*Assistant Examiner* — Mario Riojas Ramirez
(74) *Attorney, Agent, or Firm* — Schmeiser, Olsen & Watts; Anna Linne

(57) ABSTRACT

A truth maintenance method and system. The method includes receiving by a computer processor from RFID tags embedded in sensors, event data associated with events detected by said sensors. The computer processor associates portions of the event data with associated RFID tags and derives assumption data associated with each portion of the portions. The computer processor retrieves previous assumption data derived from and associated with previous portions of previous event data retrieved from the RFID tags and executes non monotonic logic with respect to the assumption data and the previous assumption data. In response, the computer processor generates and stores updated assumption data associated with the assumption data and the previous assumption data.

18 Claims, 3 Drawing Sheets

OTHER PUBLICATIONS

Attaluri et al, U.S. Appl. No. 12/888,459, filed Sep. 23, 2010, Data Based Truth Maintenance Method and System.
Rolim et al.; A Cloud Computing Solution for Patient's Data Collection in Health Care Institutions; Second International Conference on eHealth, Telemedicine, and Social Medicine; ETELEMED '10, 2010; Feb. 10-16, 2010; pp. 95-99.
Hagel et al.; Cloud Computing—Storms on the Horizon; Deloitte Center for the Edge; 2010; 20 pages.
Fahy, Joe; UPMC testing 'smart' rooms; Pittsburgh Post-Gazette; URL http://www.post-gazette.com/pg/08016/849476-53.stm; retrieved from the Internet Jun. 9, 2011; 4 pages.
Unknown (Posted by Editor); Introducing Smart Patient Rooms; Empowering Healthcare Practice and Management blog; URL http://healthcaremanagementblog.com/smart-patient-rooms/; retrieved from the Internet Jun. 6, 2011; 4 pages.
U.S. Appl. No. 13/445,299; submitted for filing Apr. 12, 2012.
Antonelli, G. Aldo, Non-monotnoic Logic, The Stanford Encyclopedia of Philosophy (Summer 2010 Edition), Edward N. Zalta (ed.), URL: <http://plato.stanford.edu/archives/sum2010/entries/logic-nonmonotic/>, retrieved from the Internet Jul. 30, 2012; 19 pages.
Office Action (Mail Date Aug. 1, 2012) for U.S. Appl. No. 12/888,459, filed Sep. 23, 2010.
Rolim et al., A Cloud Computing Solution for Patient's Data Collection in Health Care Institutions, Second International Conference on eHeatlh, Telemedicine, and Social Medicine, Feb. 10-16, 2010, 5 pages.
Hagel et al., Cloud Computing—Storms on the Horizon, Deloitte, Center for the Edge, Apr. 20, 2010, pp. 1-20.
Final Office Action (Mail Date Feb. 13, 2013/2012) for U.S. Appl. No. 12/888,459, filed Sep. 23, 2010; Confirmation No. 4485.
Amendment After Final filed in response to Final Office Action (Mail Date Feb. 13, 2013/2012) for U.S. Appl. No. 12/888,459, filed Sep. 23, 2010; Confirmation No. 4485.
Notice of Allowance (Mail Date May 9, 2013) for U.S. Appl. No. 12/888,459, filed Sep. 23, 2010; Confirmation No. 4485.

* cited by examiner

SENSOR BASED TRUTH MAINTENANCE METHOD AND SYSTEM

This Application is related to application Ser. No. 12/888,459 filed on Sep. 23, 2010.

FIELD OF THE INVENTION

The present invention relates to a method and associated system for generating assumptions based on events detected by sensors.

BACKGROUND OF THE INVENTION

Generating predictions from data retrieved from various sources typically comprises an inefficient process with little flexibility. Predictions are typically generated without any regard to additional data. Predictions generated without any regard to additional data may result in inaccurate predictions.

SUMMARY OF THE INVENTION

The present invention provides a method comprising: receiving, by a computer processor of a computing device from RFID tags embedded in sensors, first event data associated with a first plurality of events detected by the sensors, the computer processor controlling a cloud hosted mediation system comprising an inference engine software application, a truth maintenance system database, and non monotonic logic; associating, by the computer processor, first portions of the first event data with associated RFID tags of the RFID tags; deriving, by the computer processor executing the inference engine software application, first assumption data associated with each portion of the first portions of the first event data; retrieving, by the computer processor from the truth maintenance system database, previous assumption data derived from and associated with previous portions of previous event data retrieved from the RFID tags embedded in the sensors, the previous assumption data derived at a time differing from a time of the deriving, the previous event data associated with previous events occurring at a different time from the first plurality of events; executing, by the computer processor, the non monotonic logic with respect to the first assumption data and the previous assumption data; generating, by the computer processor executing the non monotonic logic and the inference engine software application, first updated assumption data associated with the first assumption data and the previous assumption data; and storing, by the computer processor in the truth maintenance system database, the first assumption data and the first updated assumption data.

The present invention provides a computer program product, comprising a computer readable storage medium having a computer readable program code embodied therein, the computer readable program code comprising an algorithm adapted to implement a method within a computing device, the method comprising: receiving, by a computer processor of the computing device from RFID tags embedded in sensors, first event data associated with a first plurality of events detected by the sensors, the computer processor controlling a cloud hosted mediation system comprising an inference engine software application, a truth maintenance system database, and non monotonic logic; associating, by the computer processor, first portions of the first event data with associated RFID tags of the RFID tags; deriving, by the computer processor executing the inference engine software application, first assumption data associated with each portion of the first portions of the first event data; retrieving, by the computer processor from the truth maintenance system database, previous assumption data derived from and associated with previous portions of previous event data retrieved from the RFID tags embedded in the sensors, the previous assumption data derived at a time differing from a time of the deriving, the previous event data associated with previous events occurring at a different time from the first plurality of events; executing, by the computer processor, the non monotonic logic with respect to the first assumption data and the previous assumption data; generating, by the computer processor executing the non monotonic logic and the inference engine software application, first updated assumption data associated with the first assumption data and the previous assumption data; and storing, by the computer processor in the truth maintenance system database, the first assumption data and the first updated assumption data.

The present invention provides a computing system comprising a computer processor coupled to a computer-readable memory unit, the memory unit comprising instructions that when enabled by the computer processor implements a method comprising: receiving, by the computer processor from RFID tags embedded in sensors, first event data associated with a first plurality of events detected by the sensors, the computer processor controlling a cloud hosted mediation system comprising an inference engine software application, a truth maintenance system database, and non monotonic logic; associating, by the computer processor, first portions of the first event data with associated RFID tags of the RFID tags; deriving, by the computer processor executing the inference engine software application, first assumption data associated with each portion of the first portions of the first event data; retrieving, by the computer processor from the truth maintenance system database, previous assumption data derived from and associated with previous portions of previous event data retrieved from the RFID tags embedded in the sensors, the previous assumption data derived at a time differing from a time of the deriving, the previous event data associated with previous events occurring at a different time from the first plurality of events; executing, by the computer processor, the non monotonic logic with respect to the first assumption data and the previous assumption data; generating, by the computer processor executing the non monotonic logic and the inference engine software application, first updated assumption data associated with the first assumption data and the previous assumption data; and storing, by the computer processor in the truth maintenance system database, the first assumption data and the first updated assumption data.

The present invention advantageously provides a simple method and associated system capable of generating predictions from data retrieved from various sources.

DETAILED DESCRIPTION OF THE INVENTION

Figure 1:
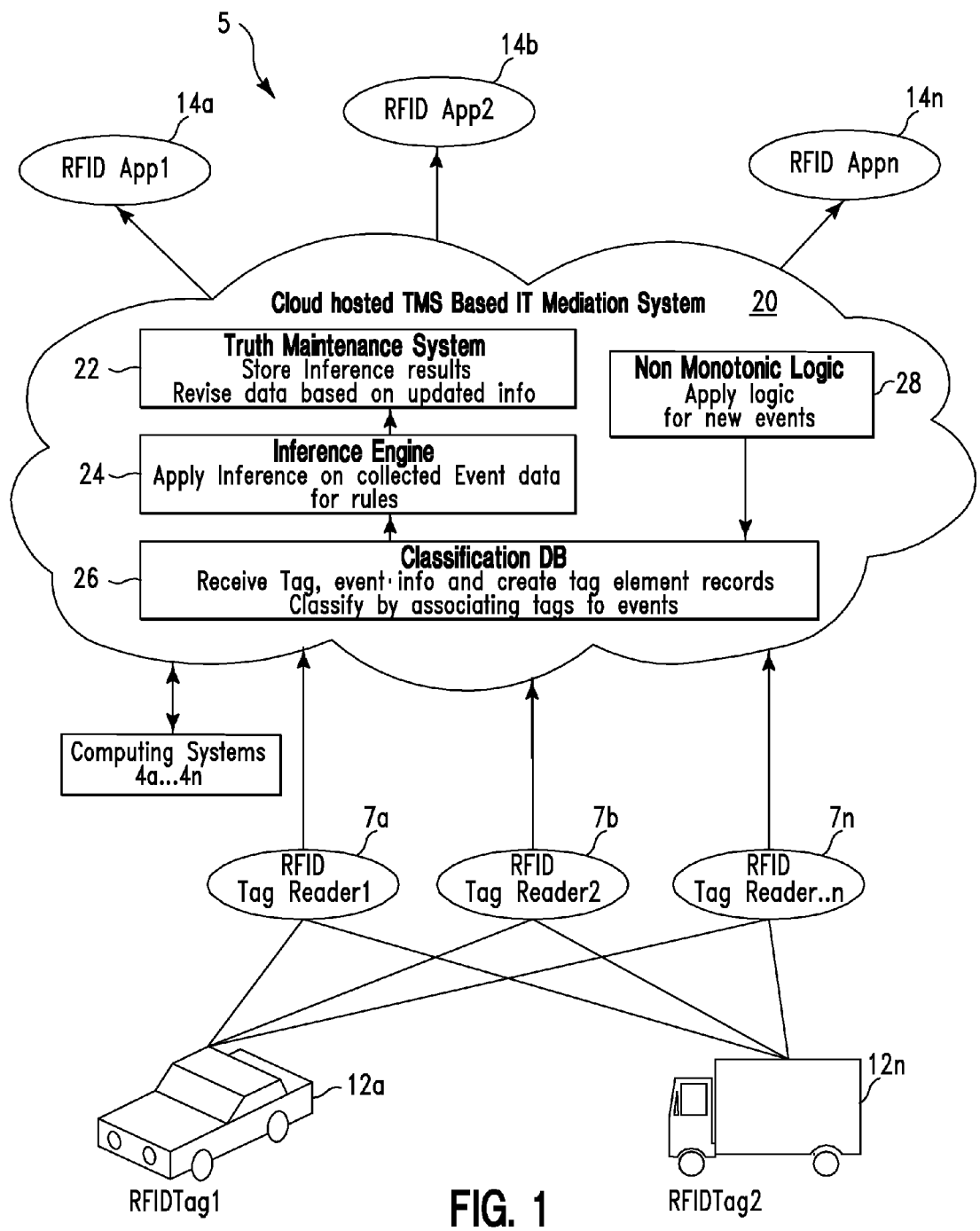
FIG. 1 illustrates a system for generating revisable assumptions based on applying monotonic logic to events detected by sensors, in accordance with embodiments of the present invention.

FIG. 1 illustrates a system 5 for generating revisable assumptions based on applying monotonic logic to events detected by sensors, in accordance with embodiments of the present invention. System 5 enables a method for providing a truth maintenance system based on retrieving information via radio frequency identification (RFID) technology (and/or any other type of transceiver system) and an (information technology) IT mediation system. System 5 provides processed and accurate RFID data received from different RFID tag readers at different intervals to backend applications by applying inference and non monotonic logic stored and managed in a truth maintenance system and implemented as a cloud based delivery model.

System 5 of FIG. 1 comprises RFID tag readers 7a . . . 7n (reading RFID tags 12a . . . 12n within sensors (e.g., speed sensors, exhaust sensors, etc) on objects (e.g., automobiles)) and RFID applications 14a . . . 14n connected to a cloud hosted mediation system 20 controlled by computing systems 4a . . . 4n. Although system 5 is described with respect to retrieving information via RFID tags 12a . . . 12n (and RFID tag readers 7a . . . 7n), note that information may be retrieved via any type of receiver/transceiver (e.g., satellite receiver/transceivers, any type of wireless receiver/transceivers, etc). Additionally, the information may be retrieved via a combination of different types of receiver/transceivers. Cloud hosted mediation system 20 is controlled by multiple computers and network devices (i.e., computing systems 4a . . . 4n) all running in 100% virtualized mode with virtual machines running application software for different functions. Cloud hosted mediation system 20 utilizes a cloud infrastructure instantiating an application based on a consumption based pay as you go delivery model. RFID tag readers 7a . . . 7n and backend applications are integrated into cloud hosted mediation system 20 using secure network protocols. Cloud hosted mediation system 20 comprises an Inference Engine (IE) 24 (software application) and advanced non monotonic logic 28 (i.e., executed as a software application) stored and managed in by a truth maintenance system (TMS) 22. TMS 22 comprises a data model. Classified event and tag data (i.e., retrieved from RFID tags 12 . . . 12n via RFID tag readers 7a . . . 7n) is inputted into inference engine 24 to derive plausible answers by applying rule based reasoning to the classified event and tag data. TMS 22 stores previously retrieved classified event and tag data and applies new knowledge information to stored updated data (i.e., stored in classification database 26). I.E. 24 derives plausible answers from retrieved evidence that is continuously being collected from multiple information sources (e.g., RFID tags 12 . . . 12n). A subset of plausible answers for some forms of evidence may be stored in a database associated with IE 24. Additionally, new plausible answers are added to the database (i.e., continuously) based on evidence collection. IE 24, TMS 22, and non monotonic logic 28 in combination provide classified RFID data analysis from multiple RFID tag readers 7a . . . 7n thereby improving outcomes and accuracy before backend applications (i.e., RFID applications 14 . . . 14n) retrieve the outcomes. Cloud hosted mediation system 20 is maintained in a pay-by-usage cloud environment reducing significant upfront investment. Cloud hosted mediation system 20 may be further integrated into overall RFID solutions to provide low cost end to end subscription and usage based pricing. In system 5, tag and event data (i.e., data retrieved via sensors) from RFID tags 12a . . . 12n are transmitted to multiple RFID tag readers 7a . . . 7n. Tag and event data retrieved from each of RFID tag readers 7a . . . 7n is collected by cloud hosted mediation system 20 where classification inferences (i.e., via IE 24) are applied and results stored in TMS 22. Non monotonic logic 28 reasoning is applied to new event data to provide updated estimates before an RFID application (e.g., RFID applications 14a . . . 14n) retrieves the estimates in order to make analytic decisions.

System 5 combines advanced artificial intelligence approaches with RFID data mediation and delivery in a cloud based usage model. System 5 provides:

1. An IT mediation system that centralizes, classifies numerous raw events, and associates them by identified RFID tag information.
2. A knowledge based artificial intelligence combined with a TMS based system and non monotonic logic reasoning improves an accuracy and reliability of RFID data received.
3. A pay-by-usage cloud model that significantly reduces upfront hardware and software investment for an IT system.
4. RFID service providers may package resulting data as a bundled pay-by-use end to end solution (e.g., by a number of events, a number of RFID tags or applications, etc).

Non monotonic logic 28 provides non monotonic reasoning with respect to system 5. Non monotonic reasoning comprises an approach in which axioms and/or rules of inference are extended to make it possible to reason with incomplete information. Additionally, non monotonic reasoning allows for reasoning that allows system 5 to back track a reasoning sequence and make an alternate decision. The following implementation example 1 describes non monotonic reasoning as follows:

EXAMPLE 1

1. A person looks outside his/her house to see that it is currently not raining and that the sky is clear (i.e., evidence 1). Therefore the person determines that there is very little chance of rain.
2. The person decides to walk to work without taking an umbrella (i.e., action 1).
3. After taking a few steps outside the house the person notices that dark clouds are forming (i.e. evidence 2).
4. Additionally, the person notices bolt of lightning in the distance (i.e., evidence 3) and determines that there is currently a very high likelihood of rain.
5. Based on this new information, the person walks back to the house (i.e., action 2) and picks up and opens an umbrella and then continues to walk to work. (i.e., action 3).

The aforementioned example demonstrates that a person believes in one outcome (such as there is very little chance of rain) based on evidence 1 and decides to take on a course of action (i.e., action 1) based on an initial belief. As new facts (i.e., evidence 2 and 3) become known which appear to contradict the initial belief the person develops a new belief (such as there is a very high likelihood of rain) and based on the new updated belief, the person backtracks on his/her initial decision and decides to take another different set of actions (i.e., actions 2 and 3).

Non monotonic logic in combination with a Dempster Shafer (D-S) theory is used to generate possible outcomes. In system 5, the utility of probability theory for modeling reasoning with uncertainty is limited by a lack of sufficient data to accurately estimate prior and conditional probabilities required in using Bayes' rule. D-S theory sidesteps the requirement for this data. D-S theory accepts an incomplete probabilistic model without prior or conditional probabilities. Given the incompleteness of the model, D-S theory does not answer arbitrary probabilistic questions. Rather than estimating the probability of a hypothesis, D-S theory uses belief intervals to estimate how close evidence is to determining a truth of a hypothesis. A non monotonic approach in accumulating evidence comprises provisions for retracting evidence and the D-S approach may be used together with a non monotonic approach to determine how much belief should be assigned to each set of evidence. System 5 computes a probability (i.e., a percentage) for each assumption as new evidence is retrieved. System 5 enables a programmed implementation (e.g., via a software application) the D-S theory of Mathematical evidence. The use of the D-S approach requires inference engine 24 to deduce belief functions. TMS 22 comprises a system/program that provides a symbolic mechanism for identifying a set of assumptions needed to assemble desired proofs so that when probabilities of the assumptions are assigned. TMS 22 may be used as a symbolic engine for computing degrees of belief sought by the D-S theory. Additionally, TMS 22 handles an effect of retracting assumptions that have been invalidated by evidence. TMS additionally keeps track of multiple plausible sets of assertions which may coexist in the absence of complete knowledge. The following example 2 describes an implementation example (i.e., with respect to example 1 comprising the rain/no rain example) for implementing TMS 22.

EXAMPLE 2

1. A belief there is "little chance of rain" (as in step 1 of example 1) is maintained in TMS 22 as one set of assumptions (i.e., set 1).
2. A belief that "there is a very high likelihood of rain" (as in step 4 of example 1) is maintained in TMS 22 as second set of assumptions (i.e., set 2). Set 2 is favored with higher belief as compared to set 1.
3. (i.e., after step 5 in example 1) The person notices that the clouds start to fade away and it becomes very sunny outside (i.e., evidence 4).
4. The person checks a weather forecast using a portable device weather application and finds there is very little possibility of rain (i.e., evidence 5).
5. The person folds the umbrella and continues to walk to work. (i.e., action 4).

In Steps 3 and 4, two new evidences are generated which result in supporting assumptions in set 1. Therefore, assumptions set 1 are now more highly favored instead of assumptions in set 2.

The following implementation example 3 enabled by system 5 of FIG. 1 comprises applying non monotonic reasoning in conjunction with TMS 22 and the D-S theory of mathematical evidence in order to explore multiple possible outcomes at a same time (or in parallel) while allowing backtracking in real time thereby recommending different outcomes as new evidence becomes known.

EXAMPLE 3

Example 3 comprises vehicle carbon emissions based routing and scheduling as handled by system 5. A vehicle carbon emission example comprises a scenario where traffic information from various information sources (such as RFID sensors on vehicles, traffic sensors, traffic toll processing sensors and their databases, traffic lights sensors, any traffic information generating database, etc) is gathered in real time and real time decisions are made about which traffic routes to recommend or allow for vehicles in order to reduce the amount of congestion and carbon footprint on specific routes. In example 3, two routes (route A and route B) are available for vehicles traveling from city 1 to city 2. System 5 performs the following method to ensure that an amount of carbon footprint on each route during the day is minimized:

1. Multiple events and related evidence is generated by various information sources for route A and route B. The information sources (retrieving the multiple events and related evidence) may include, inter alia, RFID tags embedded into carbon sensors on routes providing emissions data, vehicle id numbers, RFID sensors on vehicle tags/number plates, traffic sensors, traffic toll processing sensors and databases, traffic lights sensors, other traffic information generating databases, etc.
2. The multiple events and related evidence are retrieved by RFID tag readers and passed onto system 5 which logs the events and RFID tag information and associates them together inside classification database 26.
3. Inference Engine 24 (i.e., a computer program that derives answers based on available knowledge base) crawls through (i.e., searches) the classified data (facts) stored in classification database 26 and derives assumption type answers. (e.g., five pieces of evidence generated that support the fact that carbon emissions on route A are higher than those on route B with a belief measure of 30% and three events that support vehicle emissions on route B are higher than those on route A with a higher belief measure of 50%, thereby generating two different sets of beliefs which are assigned and processed using the D-S theory of evidence and that show that one belief is higher than the other)
4. The two sets of beliefs that are established by the previous step 3 and which are processed using D-S theory are stored in a TMS (e.g., TMS 22). A set 1 specifies that route A comprises a higher carbon foot print than route B with probability of 30%. A set 2 specifies that route B comprises a higher carbon foot print than route A with probability of 50%.
5. System 5 generates a recommendation based on set 2 and an associated higher belief assignment by D-S theory's application that traffic controllers should stop letting any additional vehicles use route B and should reroute any new traffic to route A where carbon emissions are currently lower.
6. As time passes, the evidence collected in step 1 is updated with new information as multiple new events and related evidence are generated by information sources (e.g., as specified in step 1) for route A and route B.
7. The new information is received by RFID tag readers and passed into system 5 which logs the events and tag information (i.e., describing the associated RFID tags) and associates them together inside classification database 26.
8. Inference engine 24 crawls through the classified data (facts) stored in classification database 26 and derives assumption type answers. For example, ten different events and associated evidence support the fact that carbon emissions on route A are higher than those on route B with a higher D-S theory assigned belief measure of 80% and only two events support that carbon emissions on route B are higher than those on route A with a D-S theory assigned belief of 10% thereby generating two different sets of beliefs one of which is supported more than the other.
9. The sets of beliefs that are established in step 8 and assigned using D-S theory are used to update the belief in set 1 and set 2 which are being stored in the TMS 22. As a result of this update in the D-S theory belief functions, set 1 now states that route A comprises a higher carbon foot print than route B with probability of 80% and set 2 now states that route B comprises a higher carbon foot print than route A with probability of 10%.
10. System 5 generates a recommendation based on set 1 and an associated higher belief assignment by D-S theory's application that traffic controllers should stop letting any additional vehicles use route A and should reroute any new traffic to route B (i.e., this is example of non monotonic reasoning where the decision has been reversed as new information is uncovered).

System 5 may be applied to, inter alia, the following scenarios:

1. Smart planet city services that include estimating carbon emissions and controlling vehicles violating the standards. Vehicles comprising a problem may be quickly identified and pulled off the streets. Streets comprising a highest number of emissions may be monitored for peaks and users are alerted thereby mitigating health hazards.
2. Freight/vehicle routing and scheduling whereby patterns may be observed and accurately determined based on vehicle routes. The vehicles may be efficiently re-routed.
3. Weather related applications whereby an accuracy of identification and predictability may be improved.

Figure 2:
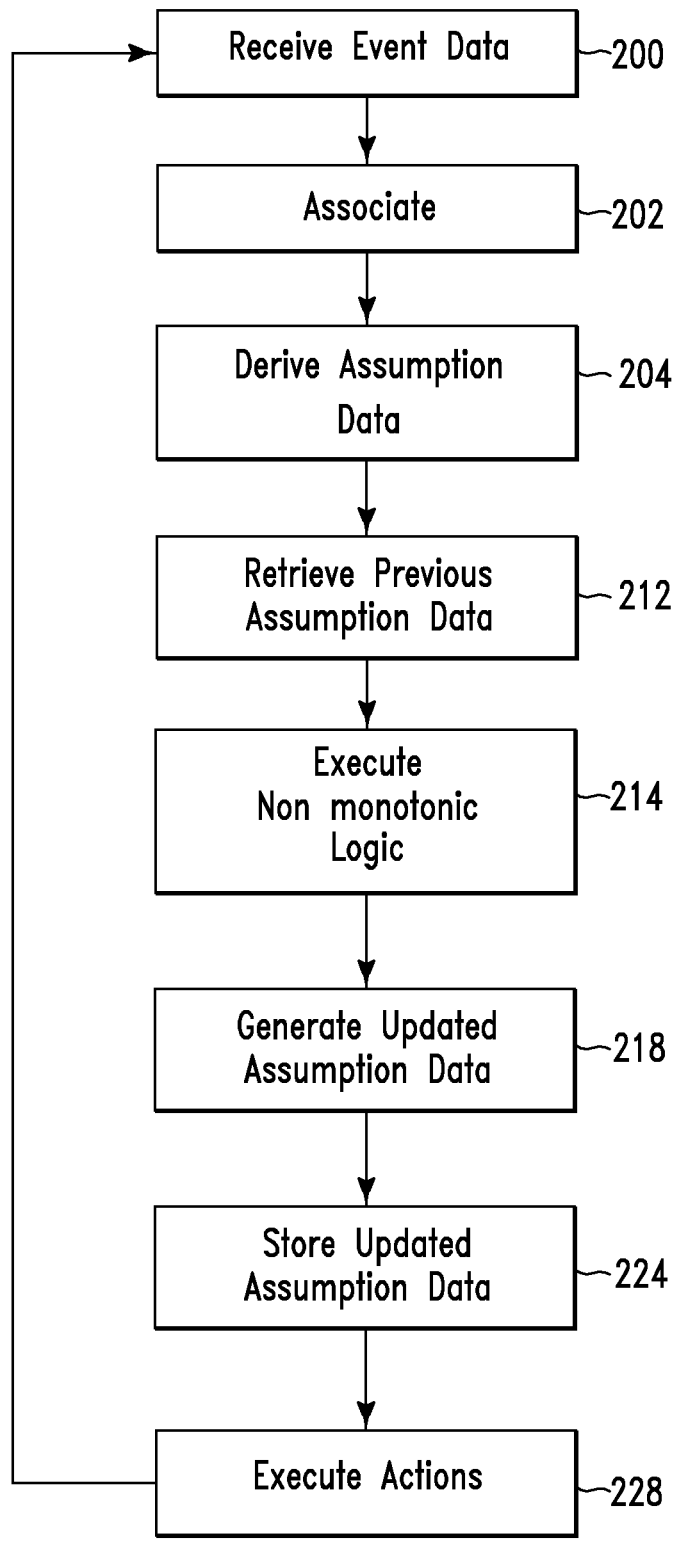
FIG. 2 illustrates an algorithm used by the system of FIG. 1 for generating revisable assumptions based on applying monotonic logic to events detected by sensors, in accordance with embodiments of the present invention.

FIG. 2 illustrates an algorithm used by system 5 of FIG. 1 for generating revisable assumptions based on applying monotonic logic to events detected by sensors, in accordance with embodiments of the present invention. In step 200, a computer processor of a computing device (e.g., computing device 10 in FIG. 1) receives (from RFID tags embedded in sensors) event data associated with events detected by the sensors. The computer processor controls a cloud hosted mediation system (e.g., cloud hosted mediation system 20 of FIG. 1) comprising an inference engine software application (e.g., inference engine software application 24 of FIG. 1), a truth maintenance system database (e.g., truth maintenance system database 22 of FIG. 1), and non monotonic logic (e.g., non monotonic logic 28 of FIG. 1). In step 202, the computer processor associated portions of the event data with associated RFID tags of the RFID tags. In step 204, the computer processor (i.e., executing the inference engine software application) derives assumption data associated with each portion of the event data. In step 212, computer processor retrieves (i.e., from said truth maintenance system database) previous assumption data derived from and associated with previous portions of previous event data retrieved from the RFID tags embedded in the sensors. The previous assumption data derived at a time differing from a time of deriving the assumption data in step 204. The previous event data is associated with previous events occurring at a different time from the events received in step 200. In step 214, the computer processor executes the non monotonic logic with respect to the assumption data and the previous assumption data. The non monotonic logic may be executed as a software program. In step 218, the computer processor generating (i.e., in response to executing the non monotonic logic and the inference engine software application) updated assumption data associated with the assumption data and the previous assumption data. In step 224, the computer processor stores (i.e., in the truth maintenance system database) the assumption data and the updated assumption data. In step 228, the computer processor executes (i.e., based on the updated assumption data) an action associated with objects detected by the sensors. The actions may include, inter alia, implementing a pay by usage cloud metering model associated with the objects, etc.

Figure 3:
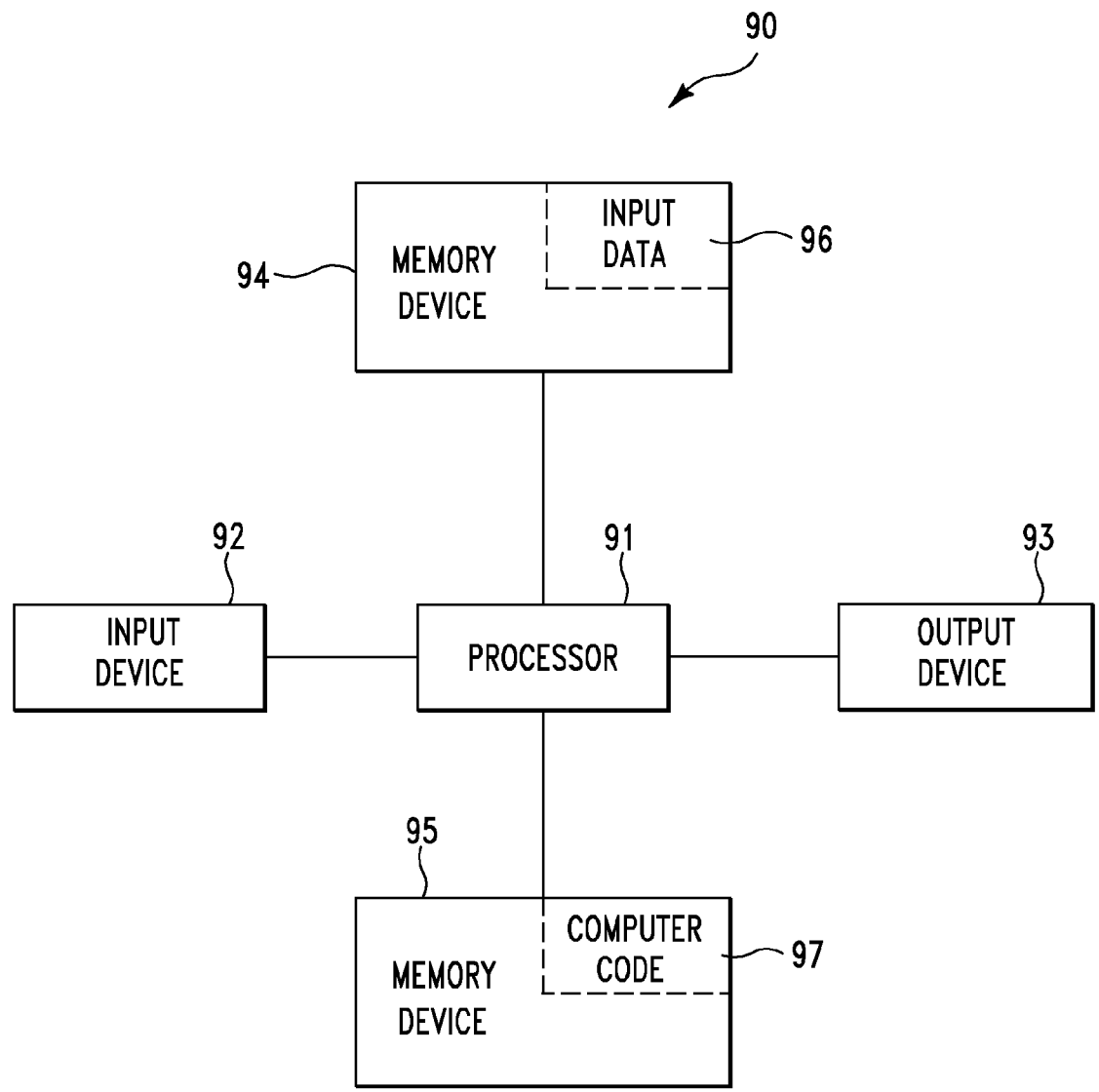
FIG. 3 illustrates a computer apparatus used for generating revisable assumptions based on applying monotonic logic to events detected by sensors, in accordance with embodiments of the present invention.

FIG. 3 illustrates a computer apparatus 90 (e.g., computing systems 4a . . . 4n of FIG. 1) used for generating revisable assumptions based on applying monotonic logic to events detected by sensors, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for generating revisable assumptions based on applying monotonic logic to events detected by sensors. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to for generate revisable assumptions based on applying monotonic logic to events detected by sensors. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating revisable assumptions based on applying monotonic logic to events detected by sensors. In another embodiment, the invention provides a method that performs the process steps of the invention on a subscription, advertising, and/or fee basis. That is, a service provider, such as a Solution Integrator, could offer to generate revisable assumptions based on applying monotonic logic to events detected by sensors. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention. All descriptions of methods and processes comprising steps herein are not limited to any specific order for performing the steps.

The invention claimed is:

1. A method comprising:

receiving, by a computer processor of a computing device from RFID tags embedded in sensors, first event data associated with a first plurality of events detected by said sensors, said computer processor controlling a cloud hosted mediation system comprising an inference engine software application, a truth maintenance system database, and non monotonic logic, wherein said non monotonic logic comprises code for enabling a Dempster Shafer theory;

associating, by said computer processor, first portions of said first event data with associated RFID tags of said RFID tags;

deriving, by said computer processor executing said inference engine software application, first assumption data associated with each portion of said first portions of said first event data, wherein said first assumption data comprises multiple sets of assumptions associated said plurality of events, wherein each set of said multiple sets comprises assumed event conditions and an associated plausibility percentage value, and wherein at least two sets of said multiple sets is associated with each event of said plurality of events;

executing, by said computer processor executing said non monotonic logic, the Dempster Shafer theory with respect to a first pair of sets of said multiple sets with respect to a first event of said plurality of events;

generating, by said computer processor based on results of said deriving and said executing, an initial recommendation for said event, said initial recommendation associated with a first selected set of said first pair of sets, said first selected set comprises a first plausibility percentage value;

retrieving, by said computer processor from said truth maintenance system database, previous assumption data derived from and associated with previous portions of previous event data retrieved from said RFID tags embedded in said sensors, said previous assumption data derived at a time differing from a time of said deriving, said previous event data associated with previous events occurring at a different time from said first plurality of events;

executing, by said computer processor, said non monotonic logic with respect to said first assumption data and said previous assumption data;

additionally executing, by said computer processor executing said non monotonic logic, the Dempster Shafer theory with respect to said first pair of sets and said previous assumption data;

modifying, by said computer processor based on results of said additionally executing, said first plausibility percentage value of said first selected set;

generating, by said computer processor based on results of said additionally executing and said modifying, an updated recommendation for said first event, said updated recommendation associated with a second selected set of said first pair of sets, said second selected set differing from said first selected set;

generating, by said computer processor executing said non monotonic logic and said inference engine software application, first updated assumption data associated with said first assumption data and said previous assumption data, wherein said previous assumption data, said first assumption data, and said first updated assumption data each comprise assumptions associated with conditions of vehicles detected by said sensors; and storing, by said computer processor in said truth maintenance system database, said first assumption data and said first updated assumption data.

2. The method of claim 1, further comprising:

executing, by said computer processor based on said first updated assumption data, an action associated with objects detected by said sensors.

3. The method of claim 2, wherein said action comprises implementing a pay by usage cloud metering model associated with said objects.

4. The method of claim 1, wherein said previous assumption data, said first assumption data, and said first updated assumption data each comprise assumptions associated with objects detected by said sensors.

5. The method of claim 1, further comprising:

receiving, by said computer processor from said RFID tags embedded in said sensors, second event data associated with a second plurality of events detected by said sensors, said second plurality of events occurring at a time differing from said first plurality of events;

associating, by said computer processor, first portions of said second event data with associated RFID tags of said RFID tags;

deriving, by said computer processor executing said inference engine software application, second assumption data associated with each portion of said first portions of said second event data;

retrieving, by said computer processor from said truth maintenance system database, said previous assumption data, said first assumption data, and said first updated assumption data;

executing, by said computer processor, said non monotonic logic with respect to said first updated assumption data, said first assumption data, said second assumption data, and said previous assumption data;

generating, by said computer processor executing said non monotonic logic and said inference engine software application, second updated assumption data associated with first updated assumption data, said first assumption data, said second assumption data, and said previous assumption data; and storing, by said computer processor in said truth maintenance system database, said second assumption data.

6. The method of claim 1, wherein said generating first updated assumption data comprises retracting portions of said first assumption data and said previous assumption data.

7. The method of claim 1, further comprising:

providing at least one support service for at least one of creating, integrating, hosting, maintaining, and deploying computer-readable code in said computing system, wherein the code in combination with the computing system is capable of performing: said receiving, said associating, said deriving, said retrieving, said executing, said generating, and said storing.

8. A computer program product, comprising a computer readable memory device storing a computer readable program code, said computer readable program code comprising an algorithm adapted to implement a method within a computing device, said method comprising:

receiving, by a computer processor of said computing device from RFID tags embedded in sensors, first event data associated with a first plurality of events detected by said sensors, said computer processor controlling a cloud hosted mediation system comprising an inference engine software application, a truth maintenance system database, and non monotonic logic, wherein said non monotonic logic comprises code for enabling a Dempster Shafer theory;

associating, by said computer processor, first portions of said first event data with associated RFID tags of said RFID tags;

deriving, by said computer processor executing said inference engine software application, first assumption data associated with each portion of said first portions of said first event data, wherein said first assumption data comprises multiple sets of assumptions associated said plurality of events, wherein each set of said multiple sets comprises assumed event conditions and an associated plausibility percentage value, and wherein at least two sets of said multiple sets is associated with each event of said plurality of events;

executing, by said computer processor executing said non monotonic logic, the Dempster Shafer theory with respect to a first pair of sets of said multiple sets with respect to a first event of said plurality of events;

generating, by said computer processor based on results of said deriving and said executing, an initial recommendation for said first event, said initial recommendation associated with a first selected set of said first pair of sets, said first selected set comprises a first plausibility percentage value;

retrieving, by said computer processor from said truth maintenance system database, previous assumption data derived from and associated with previous portions of previous event data retrieved from said RFID tags embedded in said sensors, said previous assumption data derived at a time differing from a time of said deriving, said previous event data associated with previous events occurring at a different time from said first plurality of events;

executing, by said computer processor, said non monotonic logic with respect to said first assumption data and said previous assumption data;

additionally executing, by said computer processor executing said non monotonic logic, the Dempster Shafer theory with respect to said first pair of sets and said previous assumption data;

modifying, by said computer processor based on results of said additionally executing, said first plausibility percentage value of said first selected set;

generating, by said computer processor based on results of said additionally executing and said modifying, an updated recommendation for said first event, said updated recommendation associated with a second selected set of said first pair of sets, said second selected set differing from said first selected set;

generating, by said computer processor executing said non monotonic logic and said inference engine software application, first updated assumption data associated with said first assumption data and said previous assumption data, wherein said previous assumption data, said first assumption data, and said first updated assumption data each comprise assumptions associated with conditions of vehicles detected by said sensors; and storing, by said computer processor in said truth maintenance system database, said first assumption data and said first updated assumption data.

9. The computer program product of claim 8, wherein said method further comprises:

executing, by said computer processor based on said first updated assumption data, an action associated with objects detected by said sensors.

10. The computer program product of claim 9, wherein said action comprises implementing a pay by usage cloud metering model associated with said objects.

11. The computer program product of claim 8, wherein said previous assumption data, said first assumption data, and said first updated assumption data each comprise assumptions associated with objects detected by said sensors.

12. The computer program product of claim 8, wherein said method further comprises:

receiving, by said computer processor from said RFID tags embedded in said sensors, second event data associated with a second plurality of events detected by said sensors, said second plurality of events occurring at a time differing from said first plurality of events;

associating, by said computer processor, first portions of said second event data with associated RFID tags of said RFID tags;

deriving, by said computer processor executing said inference engine software application, second assumption data associated with each portion of said first portions of said second event data;

retrieving, by said computer processor from said truth maintenance system database, said previous assumption data, said first assumption data, and said first updated assumption data;

executing, by said computer processor, said non monotonic logic with respect to said first updated assumption data, said first assumption data, said second assumption data, and said previous assumption data;

generating, by said computer processor executing said non monotonic logic and said inference engine software application, second updated assumption data associated with first updated assumption data, said first assumption data, said second assumption data, and said previous assumption data; and storing, by said computer processor in said truth maintenance system database, said second assumption data.

13. The computer program product of claim 8, wherein said generating first updated assumption data comprises retracting portions of said first assumption data and said previous assumption data.

14. A computing system comprising a computer processor coupled to a computer-readable memory unit, said memory unit comprising instructions that when enabled by the computer processor implements a method comprising:

receiving, by said computer processor from RFID tags embedded in sensors, first event data associated with a first plurality of events detected by said sensors, said computer processor controlling a cloud hosted mediation system comprising an inference engine software application, a truth maintenance system database, and non monotonic logic, wherein said non monotonic logic comprises code for enabling a Dempster Shafer theory;

associating, by said computer processor, first portions of said first event data with associated RFID tags of said RFID tags;

deriving, by said computer processor executing said inference engine software application, first assumption data associated with each portion of said first portions of said first event data, wherein said first assumption data comprises multiple sets of assumptions associated said plurality of events, wherein each set of said multiple sets comprises assumed event conditions and an associated plausibility percentage value, and wherein at least two sets of said multiple sets is associated with each event of said plurality of events;

executing, by said computer processor executing said non monotonic logic, the Dempster Shafer theory with respect to a first pair of sets of said multiple sets with respect to a first event of said plurality of events;

generating, by said computer processor based on results of said deriving and said executing, an initial recommendation for said event, said initial recommendation associated with a first selected set of said first pair of sets, said first selected set comprises a first plausibility percentage value;

retrieving, by said computer processor from said truth maintenance system database, previous assumption data derived from and associated with previous portions of previous event data retrieved from said RFID tags embedded in said sensors, said previous assumption data derived at a time differing from a time of said deriving, said previous event data associated with previous events occurring at a different time from said first plurality of events;

executing, by said computer processor, said non monotonic logic with respect to said first assumption data and said previous assumption data;

additionally executing, by said computer processor executing said non monotonic logic, the Dempster Shafer theory with respect to said first pair of sets and said previous assumption data;

modifying, by said computer processor based on results of said additionally executing, said first plausibility percentage value of said first selected set;

generating, by said computer processor based on results of said additionally executing and said modifying, an updated recommendation for said first event, said updated recommendation associated with a second selected set of said first pair of sets, said second selected set differing from said first selected set;

generating, by said computer processor executing said non monotonic logic and said inference engine software application, first updated assumption data associated with said first assumption data and said previous assumption data, wherein said previous assumption data, said first assumption data, and said first updated assumption data each comprise assumptions associated with conditions of vehicles detected by said sensors; and storing, by said computer processor in said truth maintenance system database, said first assumption data and said first updated assumption data.

15. The computing system of claim 14, wherein said method further comprises:

executing, by said computer processor based on said first updated assumption data, an action associated with objects detected by said sensors.

16. The computing system of claim 15, wherein said action comprises implementing a pay by usage cloud metering model associated with said objects.

17. The computing system of claim 14, wherein said previous assumption data, said first assumption data, and said first updated assumption data each comprise assumptions associated with objects detected by said sensors.

18. The computing system of claim 14, wherein said method further comprises:

receiving, by said computer processor from said RFID tags embedded in said sensors, second event data associated with a second plurality of events detected by said sensors, said second plurality of events occurring at a time differing from said first plurality of events;

associating, by said computer processor, first portions of said second event data with associated RFID tags of said RFID tags;

deriving, by said computer processor executing said inference engine software application, second assumption data associated with each portion of said first portions of said second event data;

retrieving, by said computer processor from said truth maintenance system database, said previous assumption data, said first assumption data, and said first updated assumption data;

executing, by said computer processor, said non monotonic logic with respect to said first updated assumption data, said first assumption data, said second assumption data, and said previous assumption data;

generating, by said computer processor executing said non monotonic logic and said inference engine software application, second updated assumption data associated with first updated assumption data, said first assumption data, said second assumption data, and said previous assumption data; and storing, by said computer processor in said truth maintenance system database, said second assumption data.

* * * * *